M. L. WILLIAMS.
VEHICLE RIM.
APPLICATION FILED FEB. 28, 1908.
969,929.
Patented Sept. 13, 1910.
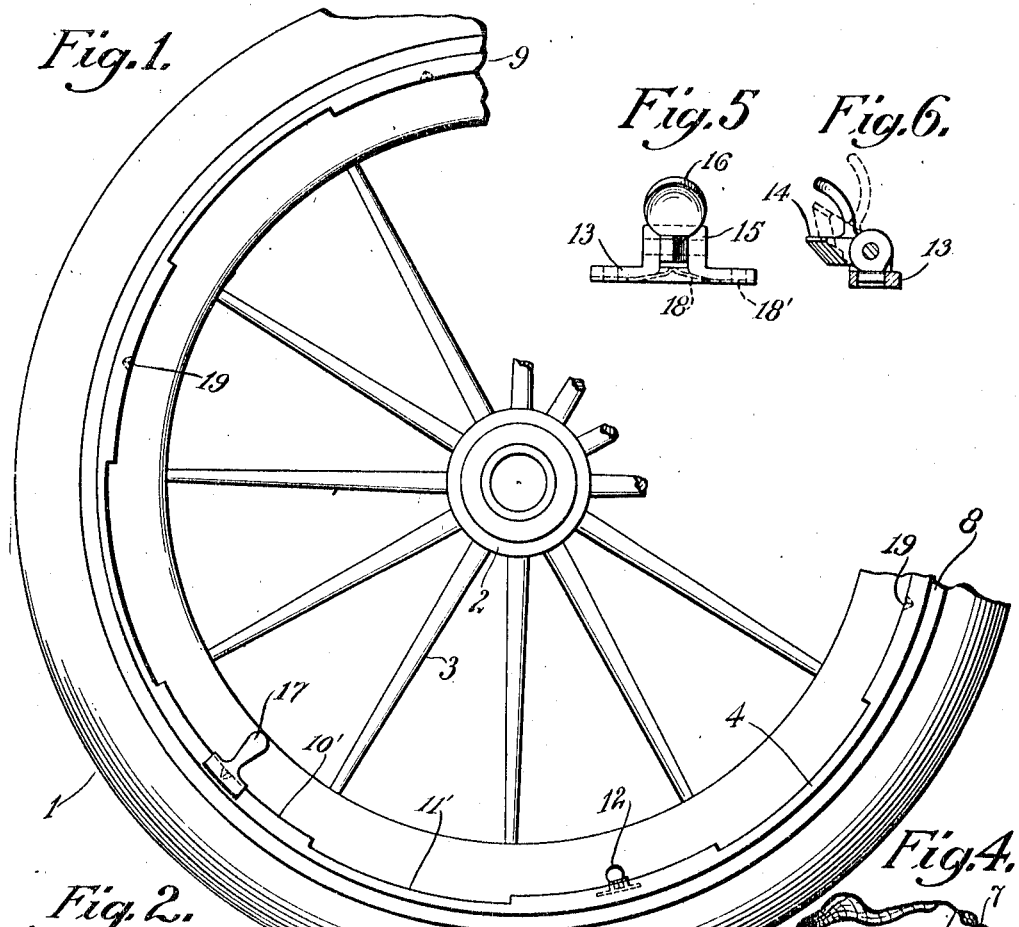
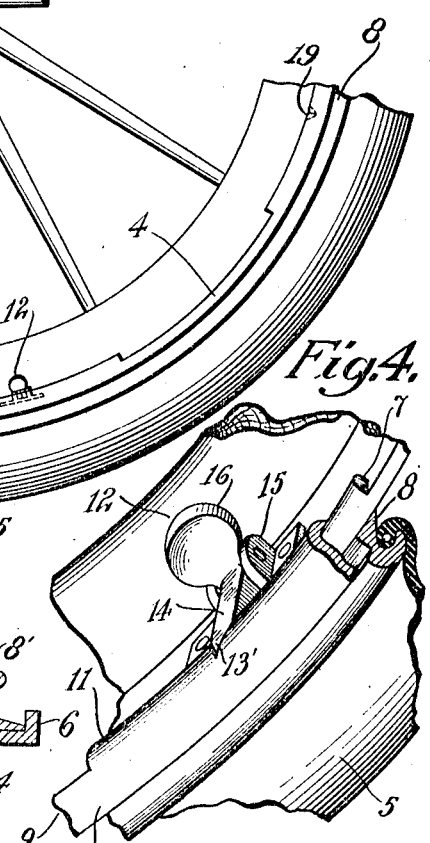
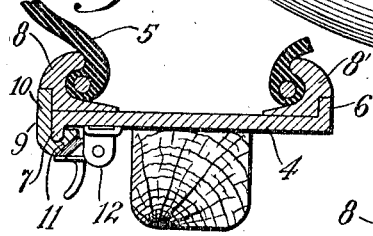
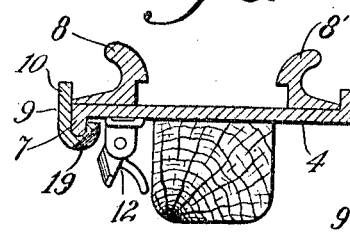
Witnesses:
Wm M. Haenel
Lois Force
Inventor:
Martin L. Williams,
By Albert N. Graves
Attorney

UNITED STATES PATENT OFFICE.

MARTIN L. WILLIAMS, OF SOUTH BEND, INDIANA.

VEHICLE-RIM.

969,929.

Specification of Letters Patent. Patented Sept. 13, 1910.

Application filed February 28, 1908. Serial No. 418,179.

*To all whom it may concern:*

Be it known that I, MARTIN L. WILLIAMS, a citizen of the United States, residing at the city of South Bend, in the county of St. Joseph and State of Indiana, have invented certain new and useful Improvements in Vehicle-Rims, of which the following is a specification.

This invention relates to improvements in vehicle rims and refers more particularly to a rim adapted for use with pneumatic or cushion tires of various types.

Among the salient objects of the invention are to provide a construction in which the tire is detachably held between a pair of confining members supported on the rim proper, one of these confining members supported on the rim proper, one of these confining members being in turn held in fixed position by means of a detachable locking ring; to provide a construction consisting of comparatively few parts, devoid of securing screws and bolts, and which can be quickly and easily assembled or disassembled without the use of any tools; to provide a device which is adapted for use with various types of tires without necessitating any material changes in the construction of the various parts; to provide an improved locking device for preventing circumferential movement of the locking ring after it has been adjusted to position upon the rim; and in general to provide a simple and reliable construction of the character referred to.

The invention will be understood from the following description, reference being had to the accompanying drawings in which—

Figure 1 is a fragmentary side elevation of a vehicle wheel embodying my invention. Fig. 2 is a detailed sectional view of my device, with the parts in assembled position and shown as adapted for use with a clencher type of tire. Fig. 3 is a somewhat similar sectional view shown as adapted for use with the so-called "universal" type of tire. Fig. 4 is a fragmentary perspective view of part of the vehicle wheel embodying my invention, parts being shown in section to bring out details of construction. Fig. 5 is a rear elevation of the locking device, the actuating spring being shown in dotted lines. Fig. 6 is a view similar to Fig. 5 taken at right angles thereto.

Referring to the drawings 1 designates as a whole a vehicle wheel comprising a hub 2, spokes 3, rim 4 and a pneumatic tire 5. The rim 4 is provided at one edge with an annular outstanding flange or rib 6, and at its opposite edge with a plurality of down turned flanges or ribs 7 which extend circumferentially of the rim. These ribs 7 of which there are six in the present instance are placed equal distance apart and are adapted to coöperate with a locking ring 9 hereinafter described.

In order to permit of the tire being detachably mounted on the rim and rigidly secured in position, I provide a pair of endless tire confining members 8—8' which are adapted to be slipped over and fit closely around the rim 4. The construction of the tire confining portions of these members 8—8' may be varied to suit the particular type of tire used. In Fig. 2 they are shown as adapted for use with a clencher type of tire while in Fig. 3 they are adapted for use with the so-called "universal" type of tire. These confining members are held in position upon the rim by the annular flange 6 heretofore described, and an endless locking ring 9 which forms an important feature of my invention. This ring 9 comprises a radially wide main body portion 10 which has at its inner edge an inturned channel shaped flange 11 which is notched or interrupted at intervals as shown at 11', leaving intervening portions 10'. The ribs or lugs 10' are slightly shorter than the spaces between the ribs 7 of the rim and may be adjusted to register with the latter. In assembling the locking ring upon the rim, the former is slipped over the side of the rim so that the notches 11' register with the ribs 7 and the inner face of locking ring engages the side of the rim and the adjacent confining member 8. By means of a pair of handles 17, one only being shown, the ring is then rotated on the rim until the ribs 10' pass behind the corresponding ribs or lugs 7 on the rim thus locking the ring 9 against lateral movement. It will be seen that the confining members are thus secured against slipping off that side of the rim.

In order to obviate any danger of circumferential movement of the locking ring upon the rim I provide an improved form of locking device designated as a whole 12. This locking member comprises a base plate 13 provided with a pair of upstanding ears 15 between which is pivotally mounted a spring pressed locking lever 14. One end of this lever is provided with a thumb handle 16, and the other end is beveled to form a wedge shaped extension 13'. The base 13 is preferably recessed for the insertion of a plate spring 18, which is bent upwardly at its central portion between the ears 15 and is so arranged that it holds the lever 14 yieldably in either its locked or unlocked position. The respective ends of this spring 18 are held in fixed position by means of studs 18' seated in the corresponding ends of the base plate 13. This locking device is rigidly fixed to the lower side of the rim at a point midway of the length of one of the ribs 7. Midlength of each of the ribs 10' of the locking ring is a notch 19 which is adapted to receive a similarly shaped end of the lever 14 when the locking ring is in position, and thus secure the latter against circumferential movement.

I claim as my invention:

1. In a vehicle wheel, the combination with a rim provided at one side with an annular outstanding flange, and at the opposite side with a plurality of spaced apart inturned lugs, a pair of endless tire retaining rings detachably mounted upon said rim, and confined against slipping off one side of the latter by said outstanding flange, an endless locking ring for preventing said detachable members from slipping off of the opposite side of said rim, said locking ring having a plurality of spaced apart outturned channel shaped flanges adapted to receive the inturned lugs of said rim, and means for preventing circumferential movement of said ring upon the rim.

2. In a vehicle wheel, the combination with a rim provided at one side with an annular outstanding flange and at the opposite side with a plurality of spaced apart inturned lugs, a pair of endless tire retaining rings, detachably mounted upon said rim, and confined against slipping off one side of the latter by said outstanding flange, an endless locking ring for preventing said detachable members from slipping off of the opposite side of said rim, said locking ring having a plurality of spaced apart outturned channel-shaped flanges adapted to receive the inturned lugs of said rim and a locking lever having operative engagement with one of said channel-shaped flanges for preventing circumferential movement of said ring upon the rim.

MARTIN L. WILLIAMS.

Witnesses:
BERTHA ESHELMAN,
J. R. AUSTIN.